United States Patent
Tanabe et al.

(10) Patent No.: US 9,871,908 B2
(45) Date of Patent: Jan. 16, 2018

(54) ELECTRONIC DEVICE, NOTIFICATION CONTROL METHOD, NON-TRANSITORY STORAGE MEDIUM, AND NOTIFICATION CONTROL SYSTEM

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/120,740

(22) PCT Filed: Jul. 30, 2014

(86) PCT No.: PCT/JP2014/070097
§ 371 (c)(1),
(2) Date: Aug. 23, 2016

(87) PCT Pub. No.: WO2015/129068
PCT Pub. Date: Sep. 3, 2015

(65) Prior Publication Data
US 2016/0366271 A1 Dec. 15, 2016

(30) Foreign Application Priority Data
Feb. 27, 2014 (JP) .................. 2014-036651

(51) Int. Cl.
*H04M 1/725* (2006.01)
*H04W 84/12* (2009.01)
*G08B 6/00* (2006.01)
*G08B 3/10* (2006.01)

(52) U.S. Cl.
CPC ...... *H04M 1/72569* (2013.01); *G08B 3/1008* (2013.01); *G08B 6/00* (2013.01); *H04W 84/12* (2013.01)

(58) Field of Classification Search
CPC .... H04W 84/12; H04M 1/72569; G08B 6/00; G08B 3/1008
USPC ....... 455/426.2, 432.2, 524, 205; 370/310.2; 340/965, 4.12, 7.6, 407.1
See application file for complete search history.

(56) References Cited

U.S. PATENT DOCUMENTS

2017/0164292 A1* 6/2017 Santamaria ....... H04W 52/0261

FOREIGN PATENT DOCUMENTS

| JP | 2006-303565 A | 11/2006 |
| JP | 2007-267180 A | * 10/2007 |
| JP | 2009-290306 A | * 12/2009 |

OTHER PUBLICATIONS

International Search Report in PCT/JP2014/070097, dated Oct. 28, 2014.

* cited by examiner

*Primary Examiner* — Inder Mehra
(74) *Attorney, Agent, or Firm* — Hauptman Ham, LLP

(57) ABSTRACT

An electronic device includes a controller for distinguishing a moving state of a user, and a notificator for notifying the user of occurrence of a predetermined event by sound or vibration. The controller decides a notification time period for the notificator according to the moving state at the time of the occurrence of the event, and can thereby adjust the notification time period for the notificator according to the moving state of the user.

5 Claims, 5 Drawing Sheets

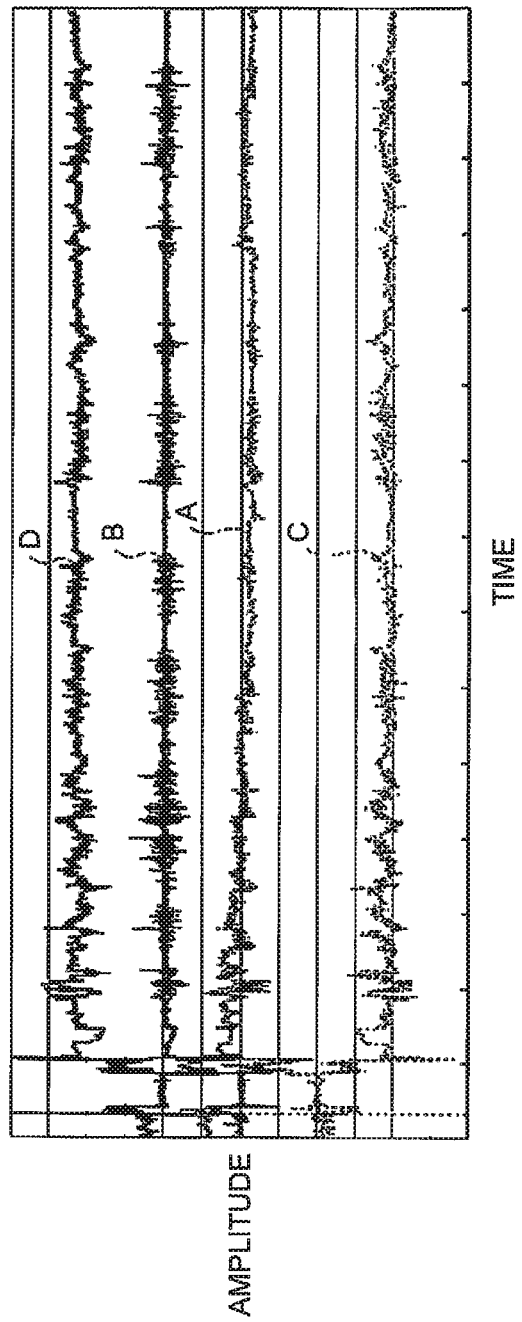

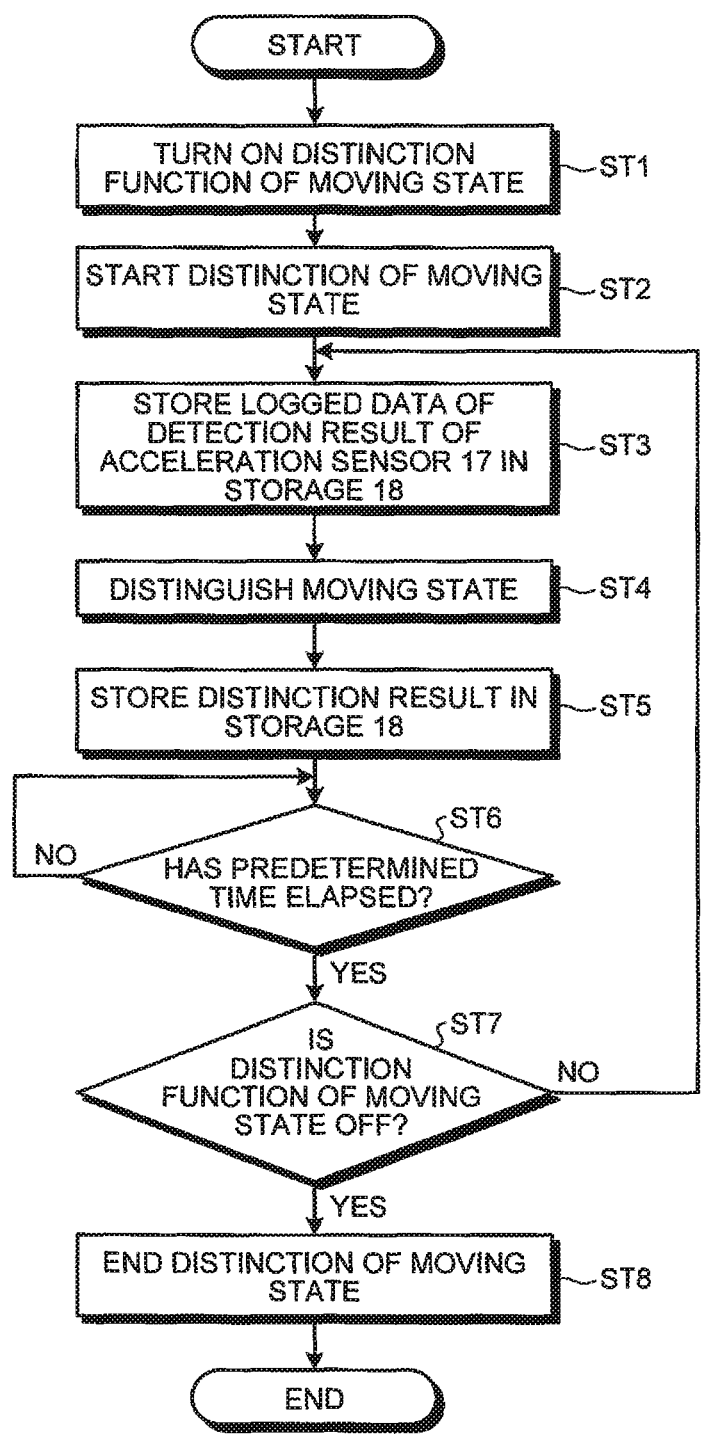

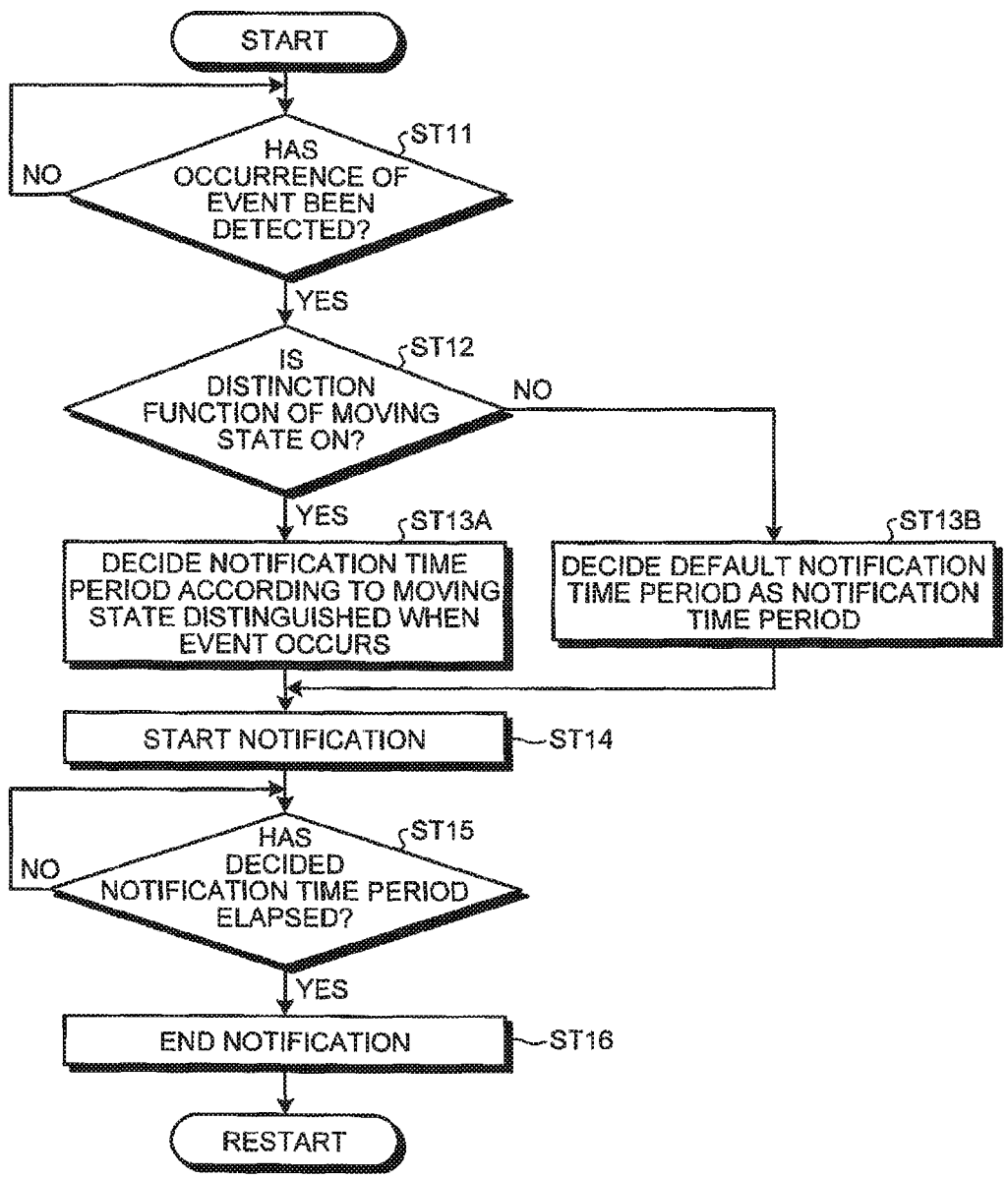

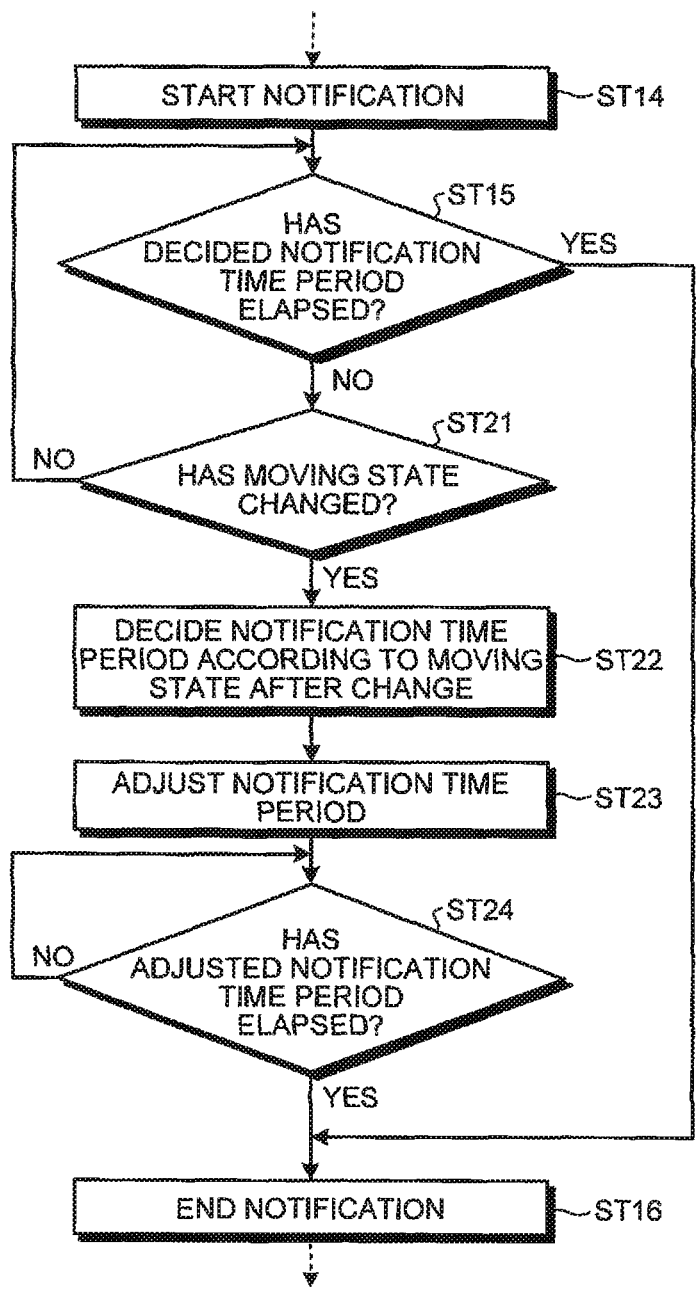

ELECTRONIC DEVICE, NOTIFICATION CONTROL METHOD, NON-TRANSITORY STORAGE MEDIUM, AND NOTIFICATION CONTROL SYSTEM

CROSS-REFERENCE TO RELATED APPLICATION

This application is a National Stage of PCT international application Ser. No. PCT/JP2014/070097 filed on Jul. 30, 2014 which designates the United States, incorporated herein by reference, and which is based upon and claims the benefit of priority from Japanese Patent Application No. 2014-036651 filed on Feb. 27, 2014, the entire contents of which are incorporated herein by reference.

FIELD

The present invention relates to an electronic device, a notification control method, a non-transitory storage medium, and a notification control system.

BACKGROUND

According to JP-A-2006-303565, there is an electronic device that determines a moving state of a user based on a detection signal output from an acceleration sensor and notifies the user of a missed call using a vibrator according to a result of the determination.

SUMMARY

As for conventional electronic device, notification control method, notification control program, and notification control system, there is room for improvement in the control method of the notification.

According to one aspect, there is provided an electronic device comprising: a controller configured to distinguish a moving state of a user out of a plurality of moving states; and a notificator configured to notify the user of occurrence of a predetermined event by sound or vibration, wherein the controller is configured to decide a notification time period for the notificator according to the moving state at the time of the occurrence of the event.

According to one aspect, there is provided a notification control method in a controller comprising: distinguishing a moving state out of a plurality of moving states; deciding a notification time period according to the distinguished moving state; and causing the occurrence of the event to be notified for the decided notification time period by sound or vibration.

According to one aspect, there is provided a non-transitory storage medium that stores a notification control program for causing a controller to execute: distinguishing a moving state out of a plurality of moving states; deciding a notification time period according to the distinguished moving state; and causing occurrence of an event to be notified for the decided notification time period by sound or vibration.

According to one aspect, there is provided a notification control system comprising: a controller configured to distinguish a moving state of a user out of a plurality of moving states; and a notificator configured to notify the user of occurrence of a predetermined event by sound or vibration, wherein the controller is configured to decide a notification time period by the notificator according to the moving state at the time of the occurrence of the event.

According to the present disclosure, the notification time period can be adjusted by a notificator according to a moving state of a user.

BRIEF DESCRIPTION OF DRAWINGS

FIG. 2 is a diagram schematically illustrating detection results of an acceleration sensor.

FIG. 3 is a first flowchart for explaining a flow of distinction operation of a moving state of the mobile phone.

FIG. 4 is a second flowchart for explaining a flow of notification operation of the mobile phone.

FIG. 5 is a third flowchart for explaining a flow of readjustment operation of notification time period of the mobile phone.

DETAILED DESCRIPTION

Figure 1:
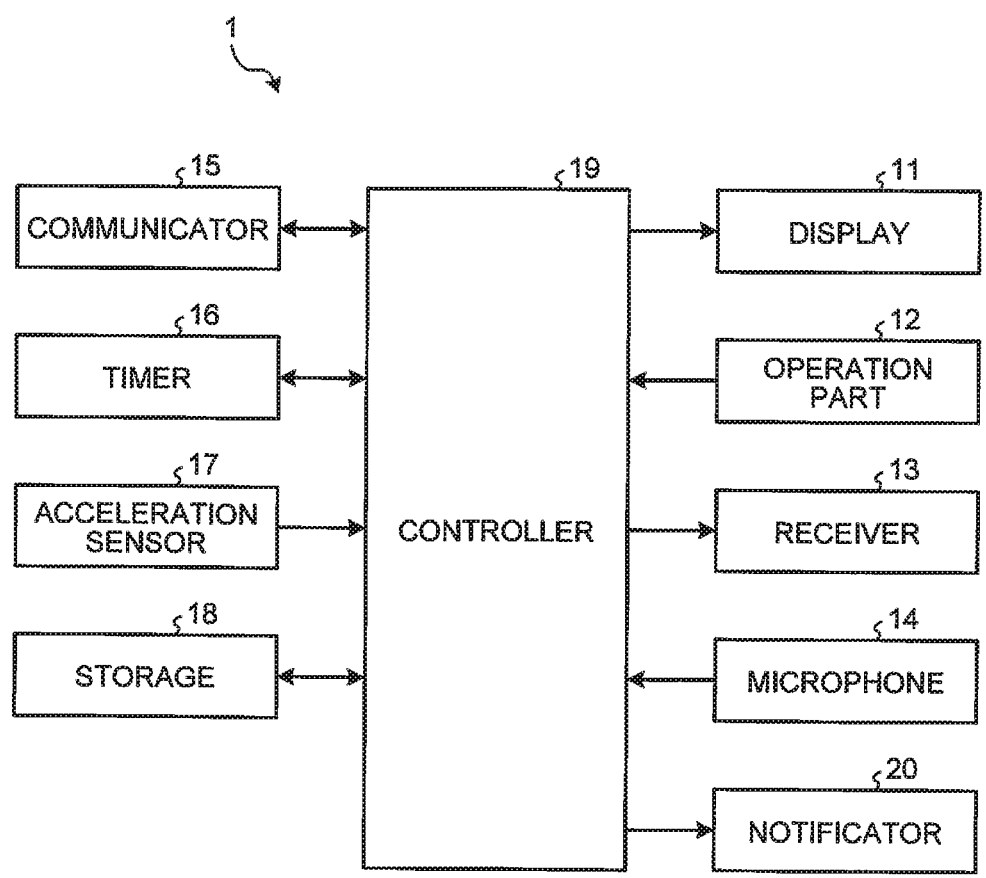
FIG. 1 is a block diagram illustrating a configuration of a mobile phone.

Some embodiments for implementing the present disclosure will be explained with reference to the accompanying drawings. A mobile phone 1 will be explained below as an example of the electronic device.

As illustrated in FIG. 1, the mobile phone 1 includes a display 11, an operation part 12, a receiver 13, a microphone 14, a communicator 15, a timer 16, an acceleration sensor 17, a storage 18, a controller 19, and a notificator 20.

The display 11 includes a display device such as a liquid crystal display, an EL (Electro-Luminescence) display, or an MEMS (Micro Electro Mechanical Systems) shutter display.

The operation part 12 includes a plurality of buttons. The operation part 12 may also include a single button or may include a touch screen. The operation part 12 is operated by a user.

The receiver 13 converts a sound signal transmitted from the controller 19 into sound and outputs the sound.

The microphone 14 inputs sound to the controller 19.

The communicator 15 includes an antenna and an RF circuit module. The communicator 15 performs communication by using communication systems respectively corresponding to a plurality of wireless communication standards. The communicator 15 enables communication by a cellular-phone communication standard such as 2G, 3G, and 4G or by a wireless LAN system. The communicator 15 enables communication by a wireless communication system, which is wireless LAN system, based on IEEE 802.11, for example, WiFi (registered trademark) wireless communication system. The communicator 15 may perform communication by a wireless communication system of WiMAX (registered trademark). The antenna and the RF circuit module are provided in plurality corresponding to a plurality of communication systems. In the present embodiment, the explanation is continued assuming that the communicator 15 performs communication based on the cellular-phone communication standard.

The timer 16 is connected to the controller 19, and allows the controller 19 to perform a regular operation and a synchronous operation by periodically transmitting an interrupt signal thereto.

The acceleration sensor 17 detects a direction and magnitude of acceleration acting on the mobile phone 1 and outputs the result of the detection to the controller 19. The acceleration sensor 17 is a three dimensional type for detecting accelerations in an X-axis direction, a Y-axis direction, and a Z-axis direction.

The acceleration sensor 17 is configured by, for example, a piezoresistive type sensor or a capacitive type sensor, but the configuration of the acceleration sensor 17 is not limited thereto. For example, the acceleration sensor 17 may be configured by a piezoelectric element (piezoelectric) type acceleration sensor, an MEMS (Micro Electro Mechanical Systems) type acceleration sensor using a heat-sensitive type; a servo type acceleration sensor for moving a moving coil and returning it to its original position by a feedback current; or a strain gauge type acceleration sensor for measuring a strain produced due to acceleration using a strain gauge.

The mobile phone 1 may include at least one of an angular velocity sensor, a geomagnetic sensor, a proximity sensor, an illumination sensor, and an atmospheric pressure sensor, in addition to the acceleration sensor 17.

The storage 18 is used for computation by the controller 19. The storage 18 includes, for example, memory. The storage 18 stores various types of programs. The programs stored in the storage 18 include a control program for controlling the modules of the mobile phone 1 and various application programs (hereinafter, simply called "application"). The applications are applications of, for example, a phone, a message, a WEB browser, a map, a game, and schedule management. The storage 18 stores a standard notification time period table in which a default notification time period is recorded. The storage 18 stores a notification time period adjustment table in which a notification time period is recorded in association individually with each of a moving state of a user.

The various programs, the standard notification time period table, and the notification time period adjustment table are stored in the storage 18 by its manufacturer at the time of manufacturing the mobile phone 1. The various programs, the standard notification time period table, and the notification time period adjustment table may be stored in the storage 18 through a communication network or through a recording medium such as a memory card and CD-ROM.

The controller 19 controls the mobile phone 1 totally, and includes a CPU (Central Processing Unit), an MPU (Micro-Processing Unit), or the like. The controller 19 performs various types of processing using the programs stored in the storage 18.

The processing for detection results of the acceleration sensor 17 performed by the controller 19 will be explained below.

As illustrated in FIG. 2, an acceleration in the X-axis direction (A in FIG. 2), an acceleration in the Y-axis direction (B in FIG. 2), an acceleration in the Z-axis direction (C in FIG. 2), and a vector value (D in FIG. 2) obtained by combining each of the accelerations are transmitted to the controller 19 as the detection result of the acceleration sensor 17. The controller 19 logs the combined vector value obtained by combining each of the accelerations. The controller 19 analyzes the logged data and distinguishes the moving state of the user. The logged data is stored in the storage 18.

Acceleration patterns are used when the controller 19 distinguishes the moving state of the user. The acceleration patterns are previously stored in, for example, the storage 18. The acceleration patterns are associated individually with a plurality of moving states. The acceleration pattern is a pattern obtained by previously measuring and extracting what kind of acceleration pattern is characteristically detected by the acceleration sensor 17 when the user carrying the mobile phone 1 stops (stop state), when the user carrying the mobile phone 1 is moving by walking (walking state), or when the user carrying the mobile phone 1 is moving by running (running state). In the present embodiment, acceleration patterns are previously stored in the storage 18, for example, for each of the moving states. The controller 19 compares the logged data of the combined vector value with the acceleration patterns to distinguish the moving states of the user. When at least one of an angular velocity sensor, an geomagnetic sensor, an proximity sensor, an illumination sensor, and an atmospheric pressure sensor is provided in addition to the acceleration sensor 17, the controller 19 may correct a distinction result of the moving state of the user based on detection result of the sensor provided in addition to the acceleration sensor 17.

The controller 19 may distinguish, instead of the acceleration pattern of the stop state, a case in which the acceleration detected by the acceleration sensor 17 is less than a predetermined value, as the stop state. The controller 19 may distinguish, instead of the acceleration pattern of the stop state, a case in which the logged data of the combined vector value does not match any one of the stored acceleration patterns, as the stop state.

The controller 19 repeatedly distinguishes the moving state at a predetermined time interval, and stores distinction results in the storage 18. In other words, the controller 19 continuously distinguishes the moving state. When the distinction result of the moving state is to be stored in the storage 18, the controller 19 may replace a latest distinction result with a previous distinction result and store the replaced result, or may store distinction results to be accumulated. When distinction results are stored to be accumulated, the controller 19 may delete distinction results previously accumulated when a predetermined amount of distinction results are accumulated.

The notificator 20 is configured by a device such as a speaker or a vibration motor. When the controller 19 detects the occurrence of a predetermined event, the notificator 20 outputs at least one of sound and vibration. The predetermined event is, for example, reception of a mail, reception of data that notifies update of an application, and reception of an output signal from an alarm application. The notificator 20 can notify the user of the occurrence of a predetermined event.

The processing of deciding a notification time period performed by the controller 19 will be explained below.

When detecting the occurrence of a predetermined event, the controller 19 specifies a moving state at the time of detecting the occurrence of the event.

The controller 19 refers to the notification time period adjustment table to decide the notification time period associated with the specified moving state as a notification time period. The controller 19 may just specify the last distinction result of the moving state which is stored in the storage 18 at the time of detecting the occurrence of the event, as the moving state when the occurrence of the event is detected. Triggered by the detection of the occurrence of the event, the controller 19 may start distinguishing the moving state of the user and specify the distinction result as the moving state when the occurrence of the event is detected.

The controller 19 causes the notificator 20 to output at least one of sound and vibration at the decided notification time period and notify the user of the occurrence of the event.

In the mobile phone 1, the controller 19 decides the notification time period by the notificator 20 depending on the moving state at the time of the occurrence of the event, and can therefore adjust the notification time period by the notificator 20 according to the moving state of the user.

The controller 19 decides the notification time period according to the distinguished moving state based on the notification time period corresponding to a predetermined moving state out of a plurality of the moving states, and can thereby adjust the notification time period by the notificator 20 based on the predetermined moving state which is determined in advance.

In order to adjust the notification time period by the notificator 20 based on the predetermined moving state determined in advance, the controller 19 just may set a notification time period for a reference moving state as a default notification time period and extend the notification time period with respect to the default notification time period when the occurrence of the predetermined event is detected. Since the controller 19 extends the notification time period with respect to the default notification time period, the notification time period adjustment table just may record an extended time period with respect to the default notification time period (hereinafter, simply called "extended time period") instead of, for example, the notification time period. The controller 19 just may decide a time obtained by adding the extended time period associated with the moving state to the default notification time period as the notification time period by referring to the notification time period adjustment table where the extended time period is stored. The extended time period associated with the moving state as the reference moving state may be recorded as "0 sec" in the notification time period adjustment table.

The controller 19 can distinguish a stop state, a walking state, and a running state as a plurality of moving states. The controller 19 can decide the notification time period so that the notification time periods in the walking state and in the running state become longer than the notification time period in the stop state, at the time of the occurrence of the event. Since the controller 19 decides the notification time period so that the notification time periods in the walking state and in the running state become longer than the notification time period in the stop state, at the time of the occurrence of the event, the user recognizes the occurrence of the event more easier.

Moreover, the controller 19 can decide the notification time period so that the notification time period by the notificator 20 becomes more longer in the order of the stop state, the walking state, and the running state as the moving state at the time of the occurrence of the event. Since the notification time period is decided by the controller 19 so that the notification time period becomes more longer in the order of the stop state, the walking state, and the running state as the moving state at the time of the occurrence of the event, the user recognizes the occurrence of the event more easier.

Here, in order that the controller 19 decides the notification time period so that the notification time period becomes more longer in the order of the stop state, the walking state, and the running state as the moving state at the time of the occurrence of the event, any table, in which the extended time periods associated individually with the stop state, the walking state, and the running state become more longer in the order of the stop state, the walking state, and the running state, should be used as the notification time period adjustment table. As the notification time period adjustment table, a table in which the extended time period associated with the stop state is recorded as "0 sec", the extended time period associated with the walking state is recorded as "3 sec", and the extended time period associated with the running state is recorded as "5 sec" can be exemplified.

The controller 19 just may decide the notification time period so that the notification time period in at least the running state out of the walking state and the running state becomes longer than the notification time period in the stop state at the time of the occurrence of the event. In the notification time period adjustment table for performing such control, the extended time period associated with at least the running state may be longer than the extended time period associated with the stop state. For example, the notification time period adjustment table should record that the extended time period associated with the stop state is "0 sec", the extended time period associated with the walking state is "0 sec", and the extended time period associated with the running state is "5 sec".

With such a configuration, the user can easily recognize the notification from the notificator 20 even in the running state in which he/she is most difficult to recognize the notification from the notificator 20.

When detecting that the moving state changes while the notificator 20 is notifying the user of the occurrence of the event, the controller 19 readjusts the notification time period according to the moving state after the change. Thereby, even if the moving state changes during the notification, the controller 19 can readjust the notification time period according to the moving state after the change.

As a pattern for readjusting the notification time period by the controller 19, a pattern in which the notification time period can be extended when the controller 19 detects that the moving state changes from the stop state to the walking state, from the walking state to the running state, or from the stop state to the running state during the notification can be exemplified. Moreover, as a pattern for readjusting the notification time period, a pattern in which the notification time period can be reduced when the controller 19 detects that the moving state changes from the walking state to the stop state, from the running state to the walking state, or from the running state to the stop state during the notification can be exemplified. When the notification time period is to be reduced by the controller 19 according to the moving state after the change, the controller 19 can perform control of reducing the notification time period even in any change of the moving state if the controller 19 can detect the change of the moving state from the moving state at the time of the notification within the time indicated as follows. That is, the controller 19 just may detect whether the moving state after the notification is changed from the moving state when the notification is started within a shortest time period among the notification time periods associated with the moving states (or the time period obtained by adding a reference notification time period to the extended time period associated with the moving state) in the notification time period adjustment table.

The flow of operation of the mobile phone 1 will be explained next with reference to a first flowchart illustrated in FIG. 3 and a second flowchart illustrated in FIG. 4.

The first flowchart illustrated in FIG. 3 is provided to explain a flow of distinction operation of the moving state of the mobile phone 1.

At Step ST1, when a distinction function of the moving state is turned on, then at Step ST2, distinction of the moving state is started by the controller 19. The operation part 12 is used to turn on the distinction function of the moving state.

When the distinction of the moving state is started at Step ST2, then at Step ST3, the controller 19 starts logging the detection result of the acceleration sensor 17. The controller 19 stores the logged data in the storage 18, and moves the process to Step ST4.

At Step ST4, the controller 19 analyzes the detection result of the acceleration sensor 17 to distinguish the moving state, and moves the process to Step ST5.

At Step ST5, the controller 19 stores the distinction result of the distinguished moving state in the storage 18, and moves the process to Step ST6.

At Step ST6, the controller 19 determines whether a predetermined time has elapsed. When it is determined that the predetermined time has elapsed (Yes), the controller 19 moves the process to Step ST7. When it is determined that the predetermined time has not elapsed (No), the controller 19 repeats the process at Step ST6. The shorter predetermined time, the better.

At Step ST7, the controller 19 determines whether the distinction function of the moving state is in an off state. When it is determined that the distinction function of the moving state is in the off state (Yes), the controller 19 ends the distinction of the moving state at Step ST8. When it is determined that the distinction function of the moving state is not off state (No), the controller 19 moves the process to Step ST3.

The second flowchart illustrated in FIG. 4 is provided to explain a flow of the notification operation of the mobile phone 1. The processes illustrated in the second flowchart are performed in parallel to the processes illustrated in the first flowchart.

At Step ST11, the controller 19 determines whether occurrence of an event has been detected, and moves the process to Step ST12 when it is determined that the occurrence of an event has been detected (Yes). When it is determined that the occurrence of an event has not been detected (No), the controller 19 repeats the process at Step ST11.

At Step ST12, the controller 19 determines whether the distinction function of the moving state is in an on state. When it is determined that the distinction function of the moving state is on state (Yes), the controller 19 moves the process to Step ST13A. When it is determined that the distinction function of the moving state is not on state (No), the controller 19 moves the process to Step ST13B.

At Step ST13A, the controller 19 decides the moving state distinguished when the event occurs, based on the distinction result of the moving state stored in the storage 18 at Step ST5. The controller 19 refers to the notification time period adjustment table to decide the notification time period according to the moving state distinguished when the event occurs, and moves the process to Step ST14. In this regard, for example, the last moving state stored in the storage 18 when the occurrence of the event is detected just may be used as the moving state distinguished by the controller 19 when the event occurs.

When the distinction result of the moving state is not stored in the storage 18 at the time of performing processing at Step ST13A, the controller 19 may refer to the standard notification time period table to select a default notification time period as the notification time period in order to decide notification time period or to select a notification time period longer than the default notification time period among notification time periods stored in the standard notification time period table as the notification time period in order to decide notification time period.

At Step ST13B, the controller 19 refers to the standard notification time period table stored in the storage 18 to select the default notification time period as the notification time period in order to decide notification time period, and moves the process to Step ST14.

At Step ST14, the controller 19 causes the notificator 20 to output sound or vibration and start notification, and moves the process to Step ST15.

At Step ST15, the controller 19 determines whether the notification time period decided at Step ST13A or Step ST13B has elapsed. When it is determined that the notification time period decided at Step ST13A or Step ST13B has elapsed (Yes), the controller 19 moves the process to Step ST16. When it is determined that the notification time period decided at Step ST13A or Step ST13B has not elapsed (No), the controller 19 repeats the process at Step ST15.

At Step ST16, the controller 19 ends the notification by the notificator 20, and restarts the process at Step ST11.

The mobile phone 1 operating in such a notification method can adjust the notification time period by the notificator 20 according to the moving state of the user.

FIG. 5 is a third flowchart for explaining a flow of readjustment operation of the notification time period of the mobile phone 1.

The controller 19 may perform a readjustment operation of the notification time period, as illustrated in the third flowchart, during the processing between Step ST15 and Step ST16 of the second flowchart illustrated in FIG. 4. Specifically, at Step ST15, the controller 19 determines whether the notification time period decided at Step ST13A or Step ST13B has elapsed. When it is determined that the notification time period decided at Step ST13A or Step ST13B has elapsed (Yes), the controller 19 moves the process to Step ST16. When it is determined that the notification time period decided at Step ST13A or Step ST13B has not elapsed (No), the controller 19 moves the process to Step ST21.

At Step ST21, the controller 19 determines whether the moving state has changed based on the distinction result of the moving state stored in the storage 18 at Step ST5. When it is determined that the moving state has changed (Yes), the controller 19 moves the process to Step ST22. When it is determined that the moving state has not changed (No), the controller 19 returns to the process at Step ST15.

At Step ST22, the controller 19 refers to the notification time period adjustment table to decide the notification time period according to the moving state after the change, and moves the process to Step ST23.

At Step ST23, the controller 19 adjusts the notification time period based on the notification time period decided at Step ST22, and moves the process to Step ST24.

At Step ST24, the controller 19 determines whether the adjusted notification time period has elapsed. When it is determined that the adjusted notification time period has elapsed (Yes), the controller 19 moves the process to Step ST16. When it is determined that the adjusted notification time period has not elapsed (No), the controller 19 repeats the process at Step ST24.

In the mobile phone 1 configured to perform such a notification operation, when the moving state changes during the notification of the occurrence of the event, the controller 19 adjusts the notification time period according to the moving state after the change, and can therefore readjust the notification time period even if the moving state changes during the notification.

The mobile phone 1 according to the present embodiment includes all the acceleration sensor 17, the controller 19, and the notificator 20, however, it may be configured that a plurality of electronic devices cooperate with each other as a system, distinguish the moving state, and decide the notification time period. When a plurality of the electronic devices cooperates with each other as a system, a plurality of controllers provided in the plurality of electronic devices may cooperate with each other, distinguish the moving state, and decide the notification time period.

Although the embodiments according to the present disclosure have been explained so far, the present disclosure is not limited to the embodiments. As the advantageous effects described in the embodiments of the present disclosure, the most suitable effects produced from the present disclosure are only enumerated, and therefore the effects according to the present disclosure are not limited to these described in the embodiments.

The invention claimed is:

1. An electronic device comprising:
    a controller configured to distinguish a moving state of a user out of a plurality of moving states; and
    a notificator configured to notify the user of occurrence of a predetermined event by sound or vibration, wherein the controller is configured to:
        decide a notification duration for the notificator according to the moving state at the time of the occurrence of the predetermined event, and
        reduce the notification duration in response to a change in the moving state, during notifying the user of the occurrence of the predetermined event, when the moving state after the change is a stop state.

2. The electronic device according to claim 1, wherein the controller is configured to decide the notification duration based on a notification duration corresponding to a predetermined moving state out of the plurality of the moving states according to the moving state at the time of the occurrence of the predetermined event.

3. The electronic device according to claim 1, wherein the controller is configured to:
    distinguish the stop state, a walking state, and a running state as the moving state, and
    decide the notification duration so that the notification duration in at least the running state, out of the walking state and the running state, is longer than the notification duration in the stop state at the time of the occurrence of the predetermined event.

4. A notification control method in a controller, the method comprising:
    distinguishing a moving state of a user out of a plurality of moving states;
    in response to an occurrence of a predetermined event,
        deciding a notification duration according to the distinguished moving state at the time of the occurrence of the predetermined event, and
        notifying the user of the occurrence of the predetermined event for the decided notification duration by sound or vibration; and
    during said notifying the user of the occurrence of the predetermined event, and in response to a change in the moving state when the moving state after the change is a stop state,
        reducing the notification duration.

5. A non-transitory storage medium that stores a notification control program for causing a controller to execute:
    distinguishing a moving state of a user out of a plurality of moving states;
    in response to an occurrence of a predetermined event,
        deciding a notification duration according to the distinguished moving state at the time of the occurrence of the predetermined event, and
        notifying the user of the occurrence of the predetermined event for the decided notification duration by sound or vibration; and
    during said notifying the user of the occurrence of the predetermined event, and in response to a change in the moving state when the moving state after the change is a stop state,
        reducing the notification duration.

* * * * *